United States Patent [19]

Bohon

[11] Patent Number: 5,022,850
[45] Date of Patent: Jun. 11, 1991

[54] PILOT FLAME APPARATUS

[75] Inventor: W. Mark Bohon, Frisco, Tex.

[73] Assignee: Atlantic Richfield Company, Los Angeles, Calif.

[21] Appl. No.: 498,195

[22] Filed: Mar. 23, 1990

[51] Int. Cl.⁵ ............................................. F23D 11/44
[52] U.S. Cl. .................................. 431/207; 431/215; 431/243; 431/199
[58] Field of Search ................ 431/207, 215, 243, 199

[56] References Cited

U.S. PATENT DOCUMENTS

| | | | |
|---|---|---|---|
| 1,493,820 | 5/1924 | Miller | 431/207 X |
| 2,243,987 | 6/1941 | Stokes | 431/207 X |
| 3,632,284 | 1/1972 | Reichhelm | 431/207 X |
| 3,685,977 | 8/1972 | Goodman | 431/207 X |

FOREIGN PATENT DOCUMENTS

| | | | |
|---|---|---|---|
| 1401756 | 2/1969 | Fed. Rep. of Germany | 431/207 |
| 3036841 | 4/1981 | Fed. Rep. of Germany | 431/207 |

*Primary Examiner*—Larry Jones
*Attorney, Agent, or Firm*—Michael E. Martin

[57] ABSTRACT

A pilot flame or burner apparatus for supporting a flame provided by a gaseous fuel and air mixture which is induced to flow to a flame nozzle by an eductor into which gaseous fuel is ejected and mixed with combustion air to flow through a fuel-air mixing chamber to the nozzle. Combustion air enters the eductor by way of an opening formed by a shroud and a heat exchanger member disposed concentrically around the flame nozzle and the flame supported thereby so as to preheat the air to minimize the formation of ice at the eductor inlet. Generally horizontal and vertically disposed embodiments of the apparatus are useful as flare pilots for flaring gases in oil and gas production and refining operations. The combustion air inlet may be arranged to face the same direction as the flame nozzle to minimize the effect of wind blowing against the nozzle. One embodiment of the apparatus includes a T-shaped baffle for containing and deflecting the pilot flame and minimizing the induction of combustion gases with the inlet combustion air.

19 Claims, 2 Drawing Sheets

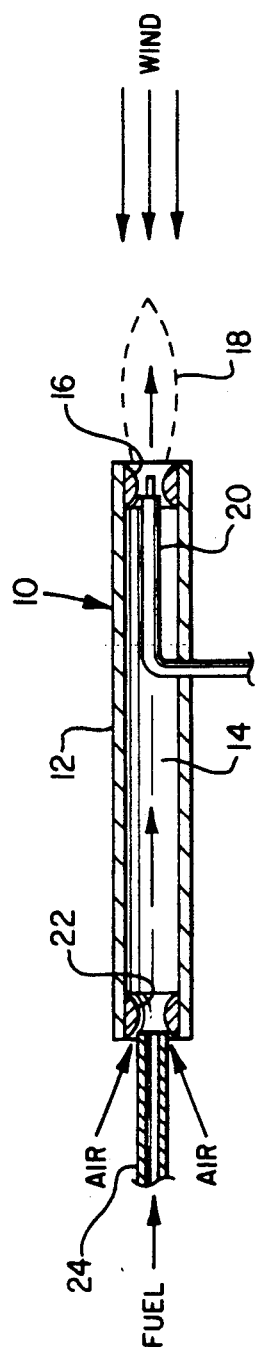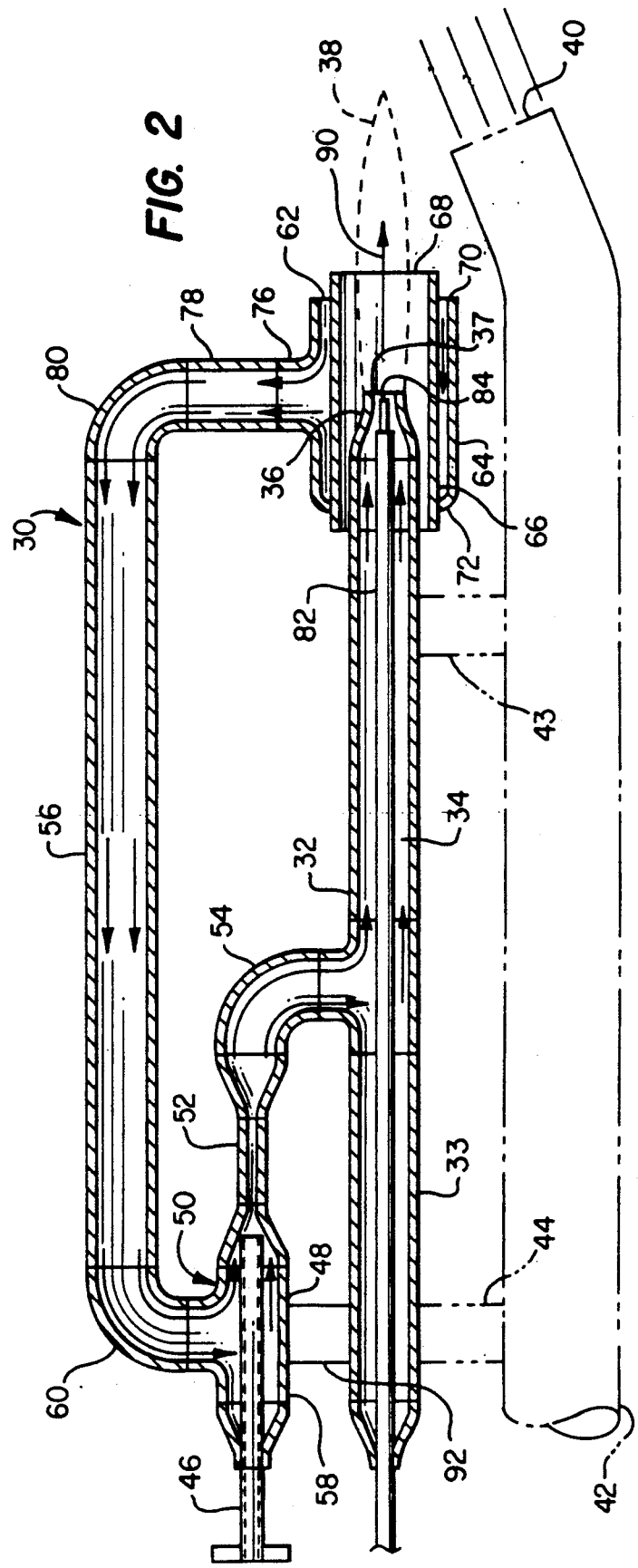

PILOT FLAME APPARATUS

BACKGROUND OF THE INVENTION

1. Field of the Invention

The present invention pertains to a frost-free, wind-resistant pilot flame or burner apparatus particularly useful as a pilot flame for a gas flare for oil and gas production and refining operations.

2. Background

In the production and refining of oil and gas, certain operations require the burning or "flaring" of excess gases as an adjunct necessity. Gas flares and associated pilot flame devices which are exposed to atmospheric conditions may suffer from weather conditions which will generate the accumulation of ice on the flare pilot apparatus due to expansion of the pilot flame combustion air and the subsequent condensation and freezing of the air entrained water vapor. Conventional flare pilot devices are also subject to being extinguished by certain wind conditions. The present invention provides an improved flame support device or flare pilot which overcomes some of the deficiencies of prior art apparatuses including those mentioned above.

SUMMARY OF THE INVENTION

The present invention provides an improved flame support device which is particularly useful as a flare pilot device for gas flares used in oil and gas drilling, production, and refining operations.

In accordance with one important aspect of the present invention, a pilot flame support device is provided which minimizes the chance of extinguishment by the accumulation of frost in the primary combustion air flowstream entering the flame support device. Primary combustion air is drawn into a conduit for mixing with pilot fuel by way of a shroud which is preheated by the pilot flame itself while minimizing the induction of combustion products or oxygen-deficient combustion air.

The flare pilot or flame support device of the present invention is also resistant to flame extinguishment due to headwinds blowing directly into the flame support nozzle. This feature is particularly advantageous for flare pilot devices which are oriented in a generally horizontal direction or in any direction which is likely to encounter air flow in direct opposition to the flow of a fuel-air mixture which generates the flame.

Alternate embodiments of the invention include a flame or flare pilot support device which is advantageous for vertically oriented flames as well as flames which are oriented in horizontal or inclined directions.

The flare pilot flame or burner support device of the present invention thus prevents the accumulation of ice around the combustion air intake ports, substantially increasing the reliability of the apparatus in cold climates. At least two embodiments of the present invention are provided which increase the tolerance of the device to headwinds, in particular, while minimizing the risk of flame extinguishment.

Still further, the present invention provides a pilot flame support device which may use both of the principal advantages described herein collectively or separately. The present invention yet further provides a pilot flame apparatus which includes an improved flame shroud and combustion air intake device which is supported in proximity to the flame while minimizing mechanical stresses on the shroud and the flame nozzle.

Those skilled in the art will recognize the above-described advantages and superior features of the invention together with other important aspects thereof upon reading the detailed description which follows in conjunction with the drawing.

BRIEF DESCRIPTION OF THE DRAWING

FIG. 1 is a longitudinal central section view of a prior art flare pilot device, in somewhat schematic form;

FIG. 2 is a longitudinal central section view of one embodiment of the flare pilot flame apparatus of the present invention;

DESCRIPTION OF PREFERRED EMBODIMENTS

Figure 3:
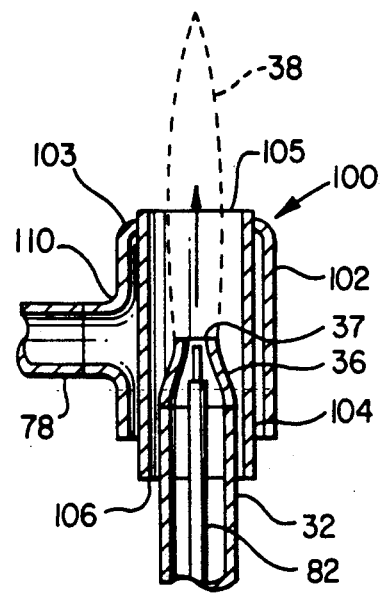
FIG. 3 is a detail section view of a first alternate embodiment of a pilot flame apparatus in accordance with the present invention.

In the description which follows, like parts are marked throughout the specification and drawing with the same reference numerals, respectively. Some of the drawing figures are not necessarily to scale in the interest of clarity and conciseness.

FIG. 1 illustrates in somewhat schematic form a prior art gas-fueled flare pilot device, generally designated by the numeral 10, of a type used in conjunction with oil and gas flaring operations. The device 10 includes a generally straight or linear tubular fuel and air mixing member 12 having an internal fuel air mixing chamber or passage 14 and a nozzle or venturi 16 which emits a fuel-air mixture which is combusted in an open flame 18. An electrical ignitor 20 is positioned in the nozzle 16 such as to ignite the fuel-air mixture passing through the nozzle. A fuel-air mixture is discharged into the passage 14 through a venturi or eductor 22 disposed at the opposite end of the device 10. A gaseous fuel is discharged into the eductor throat from a supply conduit 24 and air is drawn into the eductor by the flow of gaseous fuel from the supply conduit. The device 10 is susceptible to malfunction due to wind, particularly when the wind is in a direction opposite to the direction of flow of the air fuel mixture as it exits the nozzle 16. If the wind velocity is great enough, the stagnation pressure of the wind may overcome the effort with which the fuel-air mixture emits from the device 10 through the nozzle 16 and extinguishment of the flame 18 will occur. In any event, wind velocities usually in excess of more than light zephyrs will typically upset the fuel-air ratio and cause inefficient combustion. The prior art device 10 is also susceptible to the accumulation of ice in the eductor 22 due to the drop in pressure and temperature of the combustion air as it is drawn into the eductor. In certain climatic conditions, the ambient temperature and relative humidity may be high enough that upon eduction of the combustion air into the eductor 22 the air pressure and temperature drop will be sufficient to cause an accumulation of ice around the air inlet area between the conduit 24 and the eductor 22. This action will tend to create improper fuel-air mixtures and, in a worst case, plug the combustion air inlet area and cause extinguishment of the flame 18.

The aforementioned problems with prior art flare pilot devices have been overcome with the apparatus illustrated in FIGS. 2, 3, 4 and 5. Referring particularly to FIG. 2, there is illustrated a pilot flame apparatus adapted for use with a gas flare, which apparatus is generally designated by the numeral 30. The pilot apparatus 30 includes an elongated conduit 32 forming a chamber and passage 34 for conducting a gaseous fuel and air mixture to a flame nozzle or venturi 36 which supports a flame 38 emitting therefrom. The flame 38 is preferably placed adjacent to the outlet end 40 of a flare pipe 42 for igniting certain combustible gases emitting therefrom. The pilot flame apparatus 30 may be suitably mounted on the pipe 42 by suitable support brackets 43 and 44.

The pilot apparatus 30 further includes a gaseous fuel supply conduit 46 which enters a housing 48 forming part of an eductor 50 having a throat portion 52 and a diffuser 54. Combustion air is supplied to the eductor 50 by way of a combustion air supply conduit 56 which is connected to an eductor inlet housing portion 58 by way of a conduit elbow 60. Combustion air enters the conduit 56 by way of an inlet passage 62 which is defined in part by a generally cylindrical tubular shroud 64. The shroud 64 is disposed around an elongated tubular heat exchanger member 66 which defines with the shroud 64 the annular combustion air inlet passage 62. The member 66 has a distal end 68 which extends preferably beyond the distal end 70 of the shroud 64 to envelope the flame 38 and minimize the entrainment of combustion gases generated by the flame with the combustion air entering the combustion air passage 62 and conduit 56. The end of the shroud 64 opposite the end 70 is closed by a transverse end wall 72. Combustion air leaves the shroud 64 through an outlet conduit portion 76 which is connected to a conduit section 78 and a conduit elbow 80. An electric ignitor 82 extends within the passage 34 and has an ignitor tip 84 disposed in proximity to the outlet end of the nozzle or orifice 36. The ignitor may be of a type wherein an electric arc is created across a gap between the tip 84 and the nozzle 36 or between the tip 84 and a second electrode, not shown, formed as part of the ignitor 82.

The pilot flame apparatus 30 enjoys several advantages as compared with prior art apparatuses. The arrangement of the combustion air inlet opening or passage 62 faces the same direction as the flame nozzle outlet opening 37. In this way, wind pressure acting on the flow of gases emitting from the nozzle opening 37 is counterbalanced by an increase in the pressure of the combustion air entering the apparatus through the opening 62. For example, if the wind is in a direction opposite to the arrow 90 in FIG. 2, the pressure of the combustion air entering the conduit 56 is increased proportionate to the increase in pressure acting to stifle the flow of the fuel-air mixture from the nozzle 36. Although the combustion air pressure decreases as it flows through the eductor 50, it recovers in the diffuser 54 as the fuel-air mixture flowstream flows through the space 34 to the nozzle 36.

Generally speaking the arrangement of the inlet passage 62, the conduit 56 and the conduit 32 form a so-called U-tube configuration for combustion air and any increase in pressure due to wind blowing against the nozzle opening 37 is offset by the increase pressure of air flowing to and through the eductor 50. A second major advantage of the pilot flame apparatus 30 is the provision of the heat exchanger member 66 which forms a surface over which the combustion air entering the shroud 64 flows and is heated greatly. Such warming of the combustion air at a point upstream of the eductor 50 substantially reduces the chance of the formation of ice which would tend to clog the passage 62 and, in particular, the combustion air entrainment passage formed between the conduit 46 and the eductor 50. Thanks to extension of the heat exchanger member 66 to the distal end 68 beyond the distal end of the shroud 70, combustion air entering the passage 62 is relatively free of any combustion products that are generated by the flame 38.

Yet another advantage of the pilot flame apparatus 30 resides in the arrangement of the shroud 64 which supports the heat exchanger member 66 and itself is supported by the conduit 56. The conduit 56 is, of course, supported by the eductor housing 58 which may also be connected to a suitable support member 92 interconnecting the eductor housing with an extension 33 of the conduit 32. By supporting the heat exchanger tube 66 and the shroud 64 by means other than the fuel-air conduit tube 32 and the nozzle 36, stresses which might be induced by differential thermal expansion and contraction of the respective members are minimized.

The pilot flame apparatus 30 is particularly adapted for use in applications wherein the opening 62 projects in a generally horizontal direction as illustrated by the drawing figure. Certain applications of pilot flame apparatuses for oil and gas operations flares require vertical or near vertical orientation of the pilot flame. Referring to FIG. 3, there is illustrated a modification of the pilot flame apparatus 30, generally designated by the numeral 100. The pilot flame apparatus 100 is generally constructed like that of the pilot flame apparatus 30 except that the fuel-air mixture conduit 32 extends vertically and has the flame nozzle 36 also oriented so that the orifice 37 opens vertically and provides a vertically-extending pilot flame 38.

In order to minimize the unwanted ingestion of snow or rain into the combustion air conduit 56, a modified shroud 102 is provided along with a modified heat exchanger member 104 disposed in such a way that the combustion air inlet is provided by a downwardly facing annular opening or space 106 defined by the shroud 102 and the concentrically arranged heat exchanger member 104. The shroud 102 is closed at its upward-facing end by a transverse end wall 103 contiguous with the heat exchanger member 104. Combustion air is drawn into the pilot flame apparatus 30 through the opening 106 and around the outer surface of the heat exchanger member 104, then into the outlet 110 which is connected to the conduit portion 78 leading to the conduit 56, not shown in FIG. 3.

With the arrangement of the pilot flame apparatus 100, combustion air is preheated by flowing over the heat exchanger member 104 and thus the chance of ice forming at the inlet 106 or in the eductor 50 is minimized. The heat exchanger member 104 extends vertically upwardly to a distal end 105 which adequately surrounds and is placed in proximity to the flame 38 so as to absorb substantial heat from the flame and to provide for preheating the combustion air entering the shroud 102.

Figure 4:
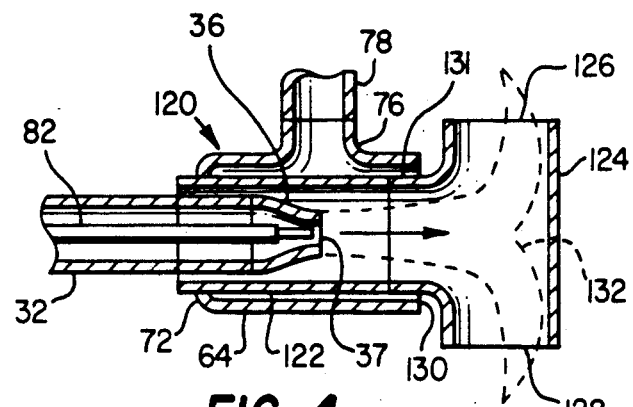
FIG. 4 is a detail section view of a second alternate embodiment of a pilot flame apparatus according to the present invention.

Referring now to FIG. 4, yet another embodiment of a pilot flame apparatus is illustrated and generally designated by the numeral 120. The pilot flame apparatus 120 is similar to the apparatus 30 in substantially all respects except that the heat exchanger member 66 of the apparatus 30 is replaced with a heat exchanger member 122 which is connected to a generally sideways T-shaped baffle 124 having opposed flame-emitting openings 126 and 128 extending vertically and upwardly and downwardly, as illustrated. An annular combustion air inlet opening 130 is provided between the shroud 64 and a branch conduit 131 of the baffle 124 and which forms part of the heat exchanger member.

As illustrated in FIG. 4, a pilot flame 132 is typically deflected in opposite directions by the baffle 124 and, if the nozzle opening 37 projects generally horizontally, the baffle 124 minimizes the deflection of the pilot flame toward the opening 130 in the event of strong winds blowing opposite to the direction of flow of combustion gases from the nozzle 36. In this way the baffle 124 minimizes the chance of the apparatus 120 ingesting pilot flame combustion products which would cause changes in the fuel-air ratio and possible extinguishment of the pilot flame in severe situations. The modified pilot flame apparatus 120 also enjoys the advantages of preheating the combustion air as it enters the opening 130 and flows around the heat exchanger member 122 and the baffle branch conduit portion 130.

Figure 5:
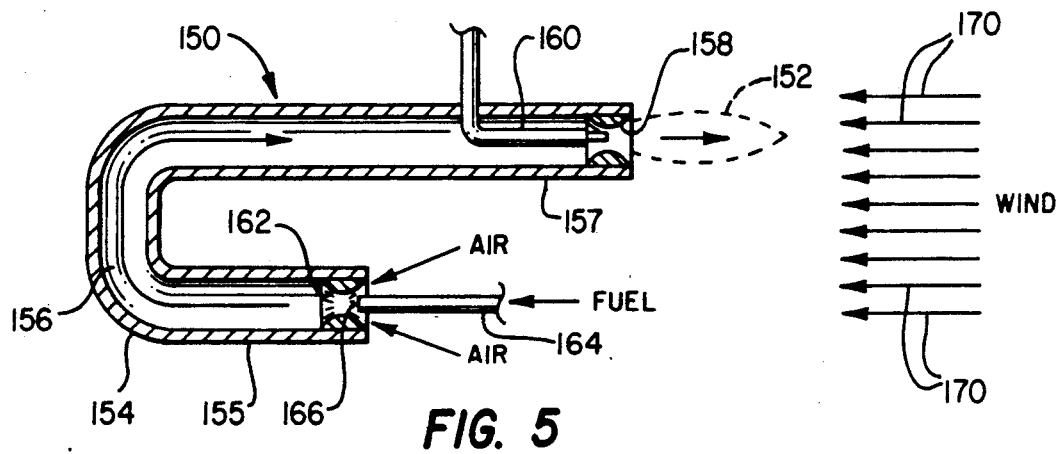
FIG. 5 is a central longitudinal section view in somewhat schematic form of a third alternate embodiment of a pilot flame apparatus according to the present invention.

Referring now to FIG. 5, there is illustrated in somewhat schematic form yet a third alternate embodiment of a pilot flame apparatus in accordance with the present invention and generally designated by the numeral 150. The apparatus 150 is adapted to enjoy the benefits of the apparatus 30 with respect to minimizing the chance of flame extinguishment due to wind flowing in the direction opposite to that of propagation of the pilot flame 152 as indicated by the arrows 170. The apparatus 150 includes a generally U-shaped tubular conduit 154 which forms an internal passage 156 for mixing a gaseous fuel with air and conducting the fuel-air mixture to a pilot flame nozzle 158 which, for the sake of illustration, is shown opening in the direction opposite to the direction of the wind. A suitable electric ignitor 160 is also disposed in proximity to the nozzle 158. The conduit 154 includes an inlet branch 155 extending in a direction opposite to and parallel with the fuel-air mixture discharge conduit branch 157. An eductor 162 is disposed at the inlet of the conduit branch 155 and also opens in the same direction as the nozzle 158. A fuel supply conduit 164 has an outlet 166 disposed upstream of the throat of the eductor 162 to provide an inlet air passage therearound for educting combustion air into the passage 156 to mix with the fuel being jetted thereinto from the conduit 164. The pilot flame apparatus 150 thus reacts to wind flowing in the direction indicated by the arrows 170 in that the stagnation pressure of air entering the eductor 162 increases in proportion to the increase in resistance to flow of the fuel-air mixture from the nozzle 158 thus minimizing the chance of extinguishment of the flame 152 or alteration of the fuel-air mixture due to the effect of wind blowing against the direction of propagation of the flame 152.

The embodiments of the pilot flame apparatus described in conjunction with FIGS. 2 through 5 herein may be constructed using conventional engineering materials for such apparatuses. Although preferred embodiments of an improved pilot flame apparatus, useful with gas flares for the oil and gas industry, in particular, have been described herein, those skilled in the art will recognize that various substitutions and modifications may be made to the invention without departing from the scope and spirit thereof as recited in the appended claims.

What is claimed is:

1. A pilot flame apparatus for generating and sustaining a flame comprising:
   conduit means including a chamber for mixing combustion air with a fluid fuel;
   flame nozzle means at one end of said conduit means and having an outlet opening for emitting a fuel-air mixture to be combusted to form a flame;
   a fuel supply conduit having a discharge end;
   eductor means in communication with said conduit means and disposed in proximity to said discharge end of said fuel supply conduit for educting combustion air into said conduit means to mix with fuel emitted from said fuel supply conduit, and means forming an ambient atmospheric combustion air inlet passage for conveying combustion air to said eductor means and whereby said combustion air inlet passage is arranged to receive ambient atmospheric combustion air flowing from a direction which is opposite to the direction of propagation of said flame so that the pressure of combustion air entering said conduit means is increased in proportion to an increase in resistance to emission of a fuel-air mixture from said outlet opening of said nozzle means caused by wind.

2. The apparatus set forth in claim 1 wherein:
   said conduit means is generally U-shaped and said eductor means has an opening forming said combustion air inlet passage facing in the same direction as said outlet opening of said nozzle means.

3. The apparatus set forth in claim 1 including:
   combustion air inlet conduit means connected to said eductor means and to said means forming said combustion air inlet passage.

4. The apparatus set forth in claim 3 including:
   heat exchanger means disposed in proximity to said combustion air inlet passage and forming a heat exchanger surface for preheating combustion air entering said inlet conduit means and said eductor means.

5. The apparatus set forth in claim 4 wherein:
   said heat exchanger means includes a member disposed in proximity to said flame for receiving heat from said flame for transfer to said combustion air.

6. The apparatus set forth in claim 5 wherein:
   said heat exchanger means includes a generally tubular member disposed around said nozzle means and extending generally adjacent to said flame, and said combustion air inlet passage is defined by and between a shroud disposed around said tubular member.

7. The apparatus set forth in claim 1 including flame baffle means disposed spaced from said nozzle means in the direction of propagation of said flame for minimizing the effect of wind blowing in a direction opposite to propagation of said flame.

8. A pilot flame apparatus for use in atmospheric conditions which are conducive to developing frost from combustion air being conducted to said apparatus, said apparatus comprising:
   a conduit for conducting a combustion air-fuel mixture to generate a pilot flame;
   a nozzle disposed at one end of said conduit having an outlet opening for emitting a fuel-air mixture to support a flame being propagated away from said nozzle;
   a fuel supply conduit;

eductor means including means forming a venturi throat and disposed with respect to said fuel supply conduit so as to create eduction of combustion air into said eductor means for mixing with said fuel, said eductor means being in communication with said combustion air-fuel conduit;

a shroud; and a heat exchanger member disposed so as to receive heat from said flame and defining with said shroud a combustion air inlet passage for admitting combustion air to said eductor means and for preheating combustion air flowing through said passage to minimize the formation of frost upon entry of said combustion air into said eductor means.

9. The apparatus set forth in claim 8 wherein:
said heat exchanger member is disposed around said nozzle and spaced therefrom.

10. The apparatus set forth in claim 8 wherein:
said heat exchanger member is supported by said shroud and said shroud is supported at a point spaced from said nozzle whereby said heat exchanger member and said nozzle may undergo thermal expansion and contraction without inducing stresses, one on the other.

11. The device set forth in claim 8 including:
combustion air inlet conduit means connected to said eductor means and to said shroud for conducting combustion air to said eductor means, said shroud and said heat exchanger member being arranged such that said combustion air inlet passage faces in the same direction as said outlet opening in said nozzle.

12. The device set forth in claim 8 including:
flame baffle means disposed spaced from said nozzle in the direction of propagation of said flame for minimizing the effect of wind blowing in a direction opposite to propagation of said flame.

13. A pilot flame apparatus for use in atmospheric conditions which are conducive to developing frost from combustion air being conducted to said apparatus, said apparatus comprising:

a conduit for conducting a combustion air-fuel mixture to generate a pilot flame;

nozzle means connected to said conduit and having an outlet opening for emitting a fuel-air mixture to support a flame;

a fuel supply conduit; and a heat exchanger member disposed at least partially around said flame so as to receive heat from said flame and defining at least in part a combustion air inlet flow passage for preheating combustion air to minimize the formation of frost in said apparatus.

14. The apparatus set forth in claim 13 including:
eductor means including means forming a venturi throat and disposed with respect to said fuel supply conduit so as to create eduction of combustion air into said eductor means for mixing with said fuel, said eductor means being in communication with said combustion air-fuel supply conduit.

15. The apparatus set forth in claim 13 wherein:
said heat exchanger member is disposed around said nozzle means.

16. The apparatus set forth in claim 15 wherein:
said heat exchanger member is supported by a shroud and said shroud is supported at a point spaced from said nozzle means whereby said heat exchanger member and said nozzle means may undergo thermal expansion and contraction without inducing stresses, one on the other.

17. The device set forth in claim 16 including:
combustion air inlet conduit means connected to said shroud, and said shroud and said heat exchanger member being arranged so as to form a combustion air inlet passage facing in the same direction as said outlet opening in said nozzle means.

18. The device set forth in claim 13 including:
flame baffle means disposed spaced from said nozzle means in the direction of propagation of said flame for minimizing the effect of wind blowing in a direction opposite to propagation of said flame.

19. The apparatus set forth in claim 16 wherein:
said shroud and said heat exchanger member are arranged to define said combustion air inlet flow passage facing generally vertically downward to minimize the ingestion of snow and rain into said combustion air inlet flow passage.

* * * * *